(12) United States Patent
Oh

(10) Patent No.: US 11,987,240 B2
(45) Date of Patent: May 21, 2024

(54) SYSTEM FOR AVOIDING BLIND SPOT OF VEHICLE AND METHOD THEREOF

(71) Applicant: HYUNDAI MOBIS CO., LTD., Seoul (KR)

(72) Inventor: Jun Hyeong Oh, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 329 days.

(21) Appl. No.: 17/345,279

(22) Filed: Jun. 11, 2021

(65) Prior Publication Data
US 2021/0394753 A1    Dec. 23, 2021

(30) Foreign Application Priority Data
Jun. 18, 2020 (KR) .................. 10-2020-0074240

(51) Int. Cl.
*B60W 30/095* (2012.01)
*G06V 20/56* (2022.01)

(52) U.S. Cl.
CPC .... *B60W 30/0956* (2013.01); *B60W 30/0953* (2013.01); *G06V 20/56* (2022.01);
(Continued)

(58) Field of Classification Search
CPC ......... B60W 30/0956; B60W 30/0953; B60W 2420/42; B60W 2554/4045; B60W 2554/4049; B60W 2552/50; B60W 2554/4023; B60W 2554/4048; B60W 2556/45; B60W 2720/10; B60W 40/02; B60W 40/105; B60W 50/0098; B60W 30/18; B60W 40/04; B60W 30/08;
(Continued)

(56) References Cited

U.S. PATENT DOCUMENTS 8,874,267 B1 *   10/2014   Dolgov .................. G08G 1/166
                                                        701/28
2009/0037088 A1 *  2/2009   Taguchi .............. B60W 30/095
                                                        701/1
(Continued)

FOREIGN PATENT DOCUMENTS

CN   105291969 A   2/2016
CN   107867227 A   4/2018
(Continued)

OTHER PUBLICATIONS

Chinese Office Action dated May 20, 2023, in counterpart Chinese Patent Application No. 202110681534.5 (7 pages in English, 11 pages in Chinese).

*Primary Examiner* — Donald J Wallace
*Assistant Examiner* — Daniel M. Robert
(74) *Attorney, Agent, or Firm* — NSIP Law

(57) ABSTRACT

A method and apparatus for avoiding a blind spot of a vehicle, where the apparatus for avoiding the blind spot of the vehicle includes an image sensor configured to provide image information by acquiring a surrounding image of a host vehicle, and a vehicle controller configured to sense a large vehicle traveling adjacent to the host vehicle based on the image information, determine a blind spot range of the large vehicle, determine a dangerous level of the blind spot range, and generate a path for the host vehicle to deviate from the blind spot or to avoids the blind spot, based on a traveling situation of the host vehicle.

19 Claims, 11 Drawing Sheets

(52) U.S. Cl.
CPC . *B60W 2420/42* (2013.01); *B60W 2554/4045* (2020.02); *B60W 2554/4049* (2020.02)

(58) Field of Classification Search
CPC ..... B60W 30/10; G06V 20/56; G06V 20/588; G06V 20/58; B60R 21/013; B60Y 2300/08; B60Y 2300/10; G08G 1/167
See application file for complete search history.

(56) References Cited

U.S. PATENT DOCUMENTS

| | | | |
|---|---|---|---|
| 2012/0218124 A1* | 8/2012 | Lee | B60W 30/18163 340/904 |
| 2018/0082589 A1* | 3/2018 | Park | B60W 60/0015 |
| 2018/0324365 A1* | 11/2018 | Choi | H04N 5/2628 |
| 2019/0071091 A1* | 3/2019 | Zhu | B60W 50/14 |
| 2019/0263401 A1* | 8/2019 | Yoo | G08G 1/167 |
| 2019/0276013 A1 | 9/2019 | Kim | |
| 2019/0361114 A1* | 11/2019 | Kim | G01S 13/42 |
| 2019/0389464 A1* | 12/2019 | Nanri | B60W 50/0097 |
| 2021/0394750 A1* | 12/2021 | Oh | B60W 40/02 |
| 2021/0394753 A1* | 12/2021 | Oh | B60W 40/105 |

FOREIGN PATENT DOCUMENTS

| | | | | |
|---|---|---|---|---|
| CN | 108859958 A | | 11/2018 | |
| CN | 110239531 A | | 9/2019 | |
| KR | 10-20130111678 | * | 10/2013 | ............... B60R 1/07 |
| KR | 101357596 B1 | * | 2/2014 | ........ G01M 17/0078 |
| KR | 10-1605660 B1 | | 3/2016 | |
| KR | 102152581 | * | 9/2020 | ............ B60W 40/09 |

\* cited by examiner

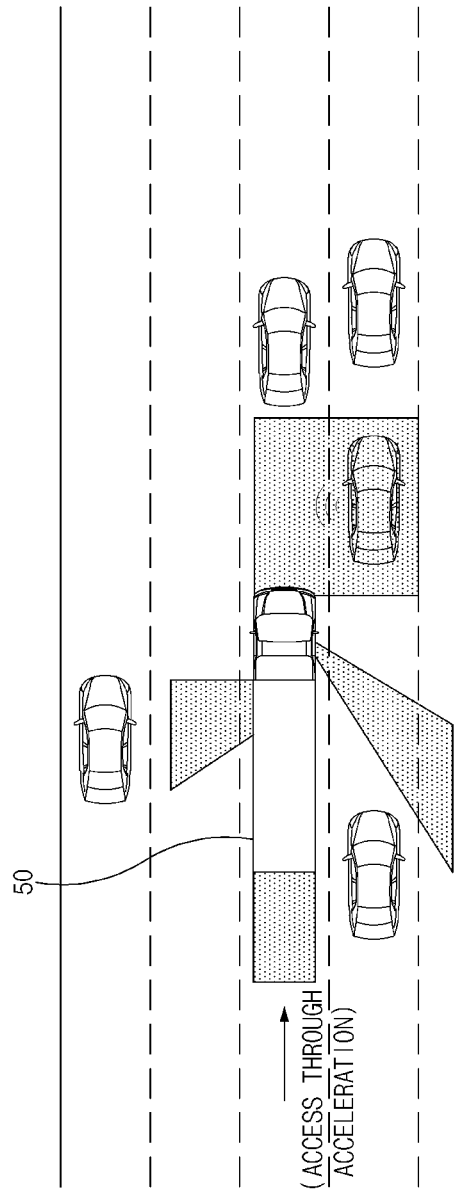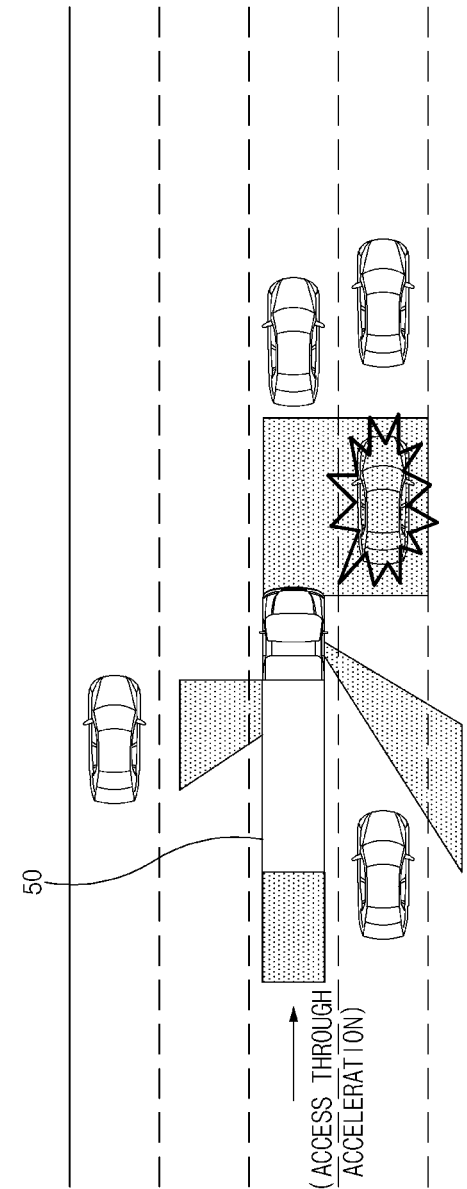

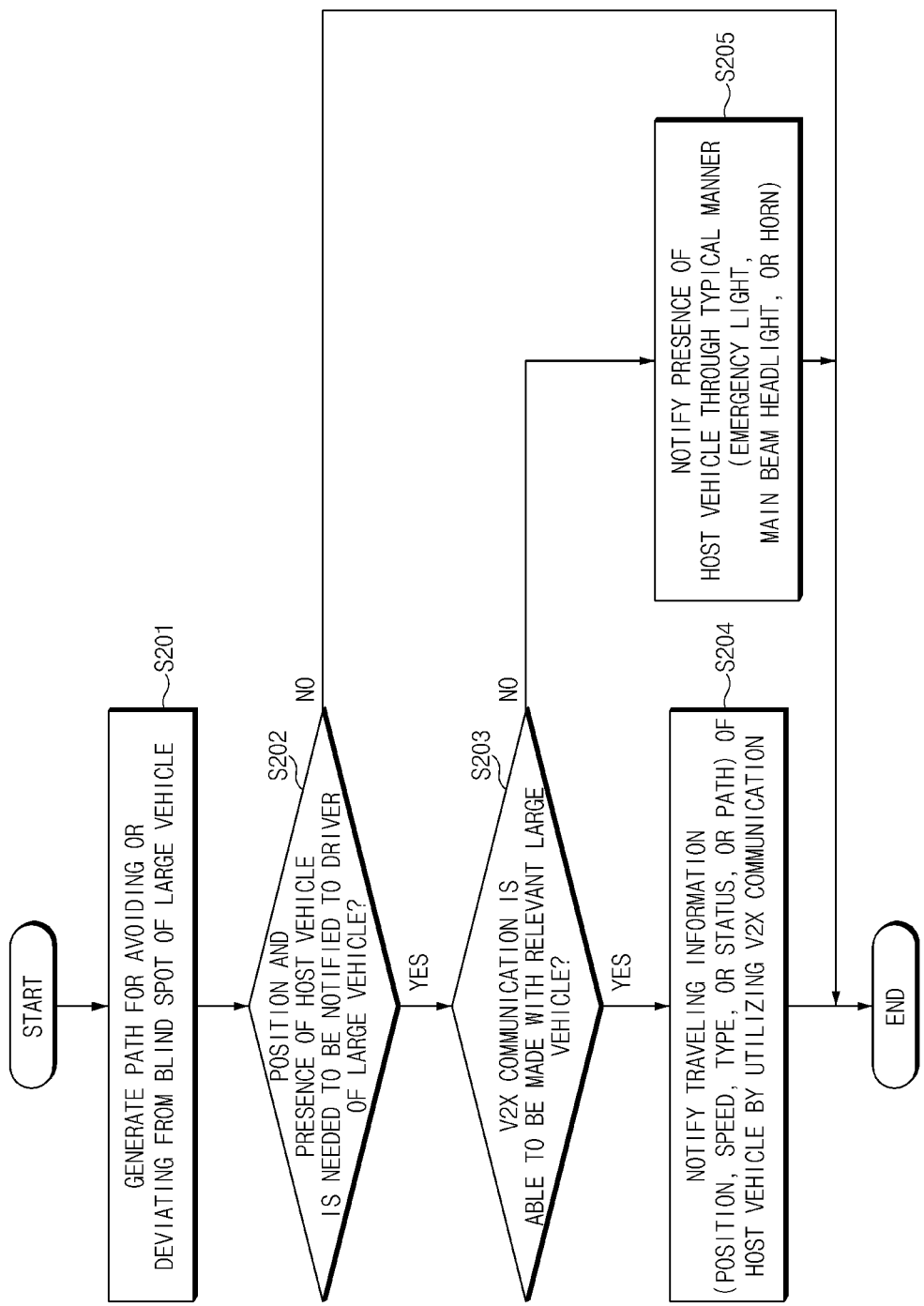

SYSTEM FOR AVOIDING BLIND SPOT OF VEHICLE AND METHOD THEREOF

CROSS-REFERENCE TO RELATED APPLICATION

This application claims the benefit under 35 U.S.C. § 119 (a) of Korean Patent Application No. 10-2020-0074240, filed on Jun. 18, 2020 in the Korean Intellectual Property Office, the entire contents of which are incorporated herein by reference for all purposes.

BACKGROUND

1. Field

The present disclosure relates to a system for avoiding a blind spot of a vehicle and a method thereof, and more particularly to a system for avoiding a blind spot of a vehicle, capable of determining a dangerous level of a blind spot of a surrounding large vehicle, and allowing a host vehicle to travel by generating a traveling path of avoiding the blind spot, thereby preventing an accident from occurring due to the blind spot of the large vehicle, and a method thereof.

2. Description of Related Art

In general, a driver has to determine a traffic situation during driving of a vehicle and to drive the vehicle. In particular, the driver has to drive the vehicle by appropriately detecting a surrounding vehicle.

However, the driver may sense only a limit area due to the structural limitation of the vehicle.

The limit area refers to a side area, which is sensed by the driver through a side view mirror, and a blind spot, which is sensed as the driver turns the head of the driver and is an area other than the side area.

Although a blind spot detection (BSD) system has been developed such that the driver recognizes the blind spot through a sensor, all vehicles are not equipped with the BSD system.

Accordingly, although a host vehicle is equipped with the BSD system, a next-lane vehicle, which is not equipped with the BSD system and positioned on a next lane, may still change the lane while failing to recognize the host vehicle positioned in a blind spot of the next-lane vehicle, and the host vehicle has to avoid the blind spot and travel.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for avoiding a blind spot of a vehicle, the apparatus including an image sensor configured to provide image information by acquiring a surrounding image of a host vehicle, and a vehicle controller configured to sense a large vehicle traveling adjacent to the host vehicle based on the image information, determine a blind spot range of the large vehicle, determine a dangerous level of the blind spot range, and generate a path for the host vehicle to deviate from the blind spot or to avoids the blind spot, based on a traveling situation of the host vehicle.

The vehicle controller may include a blind spot range generator configured to sense the large vehicle traveling adjacent to the host vehicle, based on the image information and to determine a default blind spot range of the large vehicle, a traveling road information generator configured to provide, as traveling road information, information on a road on which the host vehicle is travelling, based on the image information, a blind spot range changing device configured to change the default blind spot range, based on the traveling road information, a blind spot dangerous level determiner configured to match the dangerous level with the changed default blind spot range, and a path generator configured to generate a path to minimize the dangerous level, based on the traveling situation of the host vehicle and to longitudinally or laterally control the host vehicle.

The blind spot range generator may include an object type determining device configured to determine a type of the large vehicle, based on the image information, an object size determining device configured to calculate a size of the large vehicle, based on the image information, a host vehicle information store configured to store at least a height of the host vehicle and a roof area of the host vehicle, and a blind spot range determiner configured to determine the default blind spot range, based on the type of the large vehicle, the size of the large vehicle, the height of the host vehicle, and the roof area of the host vehicle.

The blind spot range determiner may be configured to select one of blind spots stored depending on types of large vehicles, based on the type of the large vehicle, match the selected blind spot with the large vehicle, and determine the default blind spot range based on the size of the large vehicle, the height of the host vehicle, and the roof area of the host vehicle.

The blind spot dangerous level determiner may be configured to match the dangerous level to the default blind spot range changed depending on a traveling path of the host vehicle and a traveling path of the large vehicle, based on a merging point included in the traveling road information.

The vehicle controller may be configured to transmit traveling information of the host vehicle to the large vehicle, in response of a failure to generate a path in which the host vehicle deviates from the blind spot range of the large vehicle.

The vehicle controller may be configured to transmit traveling information of the host vehicle to the large vehicle, in response to the path of avoiding the blind spot of the large vehicle passing through the blind spot.

The vehicle controller may be configured to control the host vehicle to decelerate on a traveling path, in response to a failure to generate the path in which the host vehicle deviates from the blind spot or avoids the blind spot for traveling.

The vehicle controller may be configured to generate the path to minimize a dangerous level of the blind spot.

In another general aspect, there is provided a processor-implemented method for avoiding a blind spot of a vehicle, the method including providing image information by acquiring a surrounding image of a host vehicle through an image sensor, sensing, by a vehicle controller, a large vehicle traveling adjacent to the host vehicle based on the image information, determining a blind spot range of the large vehicle, determining a dangerous level of the blind spot range, and generating a path for the host vehicle to deviate from the blind spot or to avoid the blind spot, based on a traveling situation of the host vehicle.

The method may include the sensing of the large vehicle may include sensing the large vehicle traveling adjacent to the host vehicle and determining a default blind spot range of the large vehicle, providing, as traveling road information, information on a road on which the host vehicle is travelling, based on the image information, changing the default blind spot range, based on the traveling road information, and matching the dangerous level with the changed default blind spot range, and the generating of the path may include generating a path to minimize the dangerous level, based on the traveling situation of the host vehicle and longitudinally or laterally controlling the host vehicle.

The determining of the default blind spot range may include determining a type of the large vehicle, based on the image information, calculating a size of the large vehicle, based on the image information, storing data of the host vehicle, including a height of the host vehicle and a roof area of the host vehicle, and determining the default blind spot range, based on the type of the large vehicle, the size of the large vehicle, the height of the host vehicle, and the roof area of the host vehicle.

The determining of the default blind spot range may include selecting one of blind spots stored depending on types of large vehicles, based on the determined type of the large vehicle, and matching the selected blind spot with the sensed large vehicle, and determining the default blind spot range based on the determined size of the large vehicle, the height of the host vehicle, and the roof area of the host vehicle, such that blind spot range is determined.

The matching of the dangerous level with the changed default blind spot range may include matching the dangerous level to the default blind spot range changed depending on a traveling path of the host vehicle and a traveling path of the large vehicle, based on a merging point included in the traveling road information.

The generating of the path in which the host vehicle deviates from the blind spot or avoids the blind spot, may include transmitting traveling information of the host vehicle to the large vehicle, in response of a failure to generate a path in which the host vehicle deviates from the blind spot range of the large vehicle.

The generating of the path in which the host vehicle deviates from the blind spot or avoids the blind spot, may include transmitting traveling information of the host vehicle to the large vehicle, in response to the path of avoiding the blind spot of the large vehicle passing through the blind spot.

The generating of the path in which the host vehicle deviates from the blind spot or avoids the blind spot, may include controlling the host vehicle to decelerate on a traveling path, in response to a failure to generate the path in which the host vehicle deviates from the blind spot or avoids the blind spot for traveling.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings:

FIGS. 8A to 9B are views illustrating generation of a path through a system for avoiding a blind spot of a vehicle, according to an embodiment of the present disclosure; and FIGS. 10 and 11 are flowcharts illustrating a method for avoiding a blind spot of a, according to an embodiment of the present disclosure.

DETAILED DESCRIPTION

Figure 1:
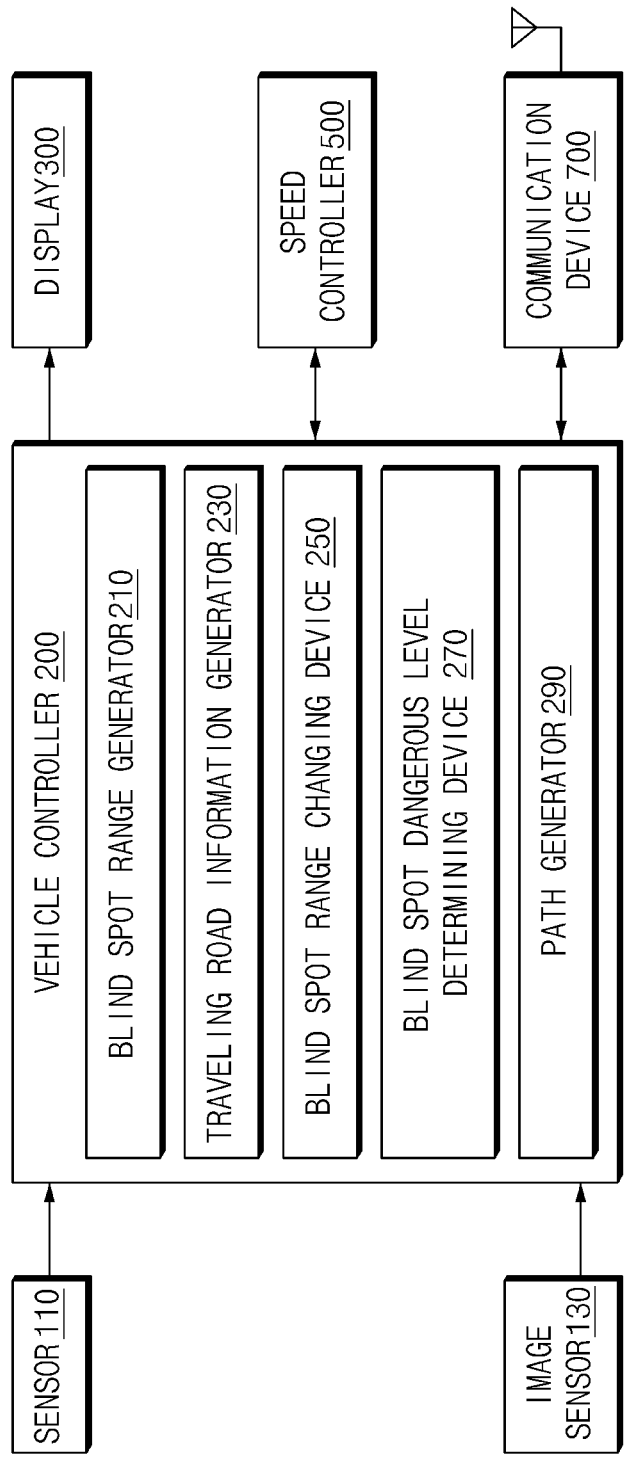
FIG. 1 is a block diagram illustrating a system for avoiding a blind spot of a vehicle, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 9.

Figure 2:
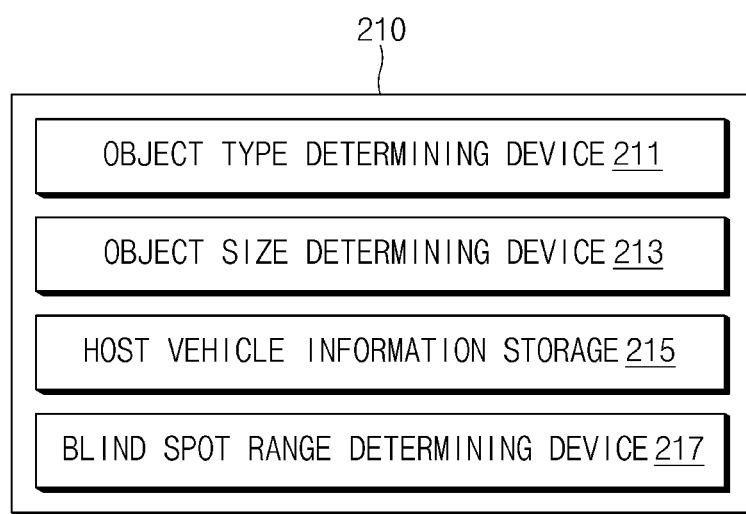
FIG. 2 is a block diagram illustrating a blind spot range generator constituting a system for avoiding a blind spot of a vehicle, according to an embodiment of the present disclosure.
Figure 3:
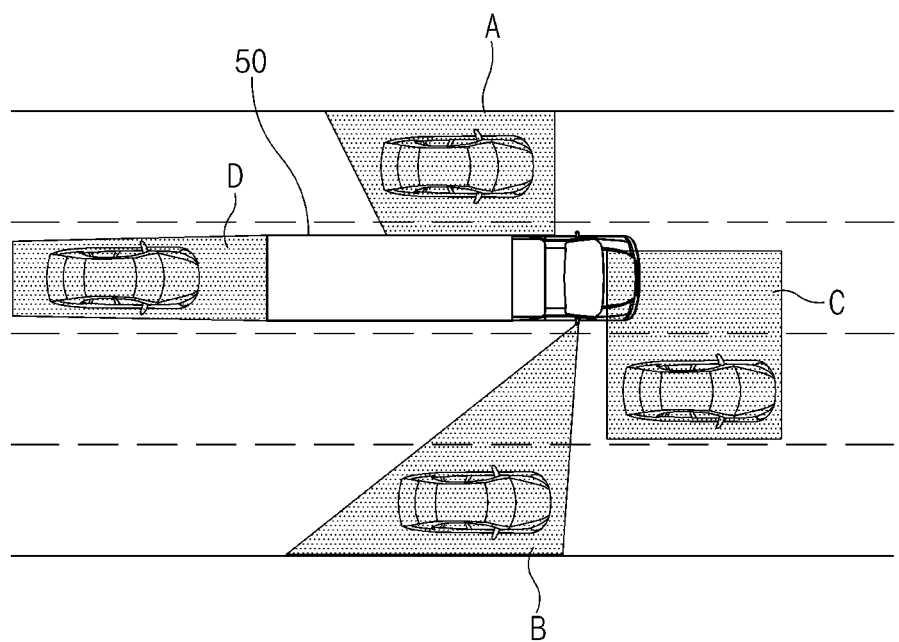
FIG. 3 is a view illustrating a blind spot of a large vehicle applied to a system for avoiding a blind spot of a vehicle, according to an embodiment of the present disclosure.

FIG. 1 is a block diagram illustrating a system for avoiding a blind spot of a vehicle, according to an embodiment of the present disclosure, FIG. 2 is a block diagram illustrating a blind spot range generator constituting a system for avoiding a blind spot of a vehicle, according to an embodiment of the present disclosure, and FIG. 3 is a view illustrating a blind spot of a large vehicle applied to a system for avoiding a blind spot of a vehicle, according to an embodiment of the present disclosure. FIGS. 4 to 7 are views illustrating detection of a blind spot of a large vehicle through a system for avoiding a blind spot of a vehicle, according to an embodiment of the present disclosure, and FIGS. 8 and 9 are views illustrating generation of a path through a system for avoiding a blind spot of a vehicle, according to an embodiment of the present disclosure.

Referring to FIG. 1, according to an embodiment of the present disclosure, a system for avoiding the blind spot of the vehicle may include a sensor 110, an image sensor 130, a vehicle controller 200, a display 300, a speed controller 500, and a communication device 700.

The sensor 110 may include a radar, a Light Detection and Ranging (LiDAR), and an ultrasonic sensor mounted on a side surface of the host vehicle 100, may sense a next-lane vehicle traveling on a lane next to a lane of the host vehicle 100, and may provide information on the next-lane vehicle to the vehicle controller 200.

The image sensor 130 may include at least one of a front camera to acquire a front image of the host vehicle 100, a rear camera to acquire a rear image of the host vehicle 100, a left camera to acquire a left image of the host vehicle 100, or a right camera to acquire a right image of the host vehicle 100. The image sensor 130 may acquire a surrounding image of the host vehicle 100, may generate image information, and may provide the generated image information to the vehicle controller 200.

For example, the image sensor 130 may acquire the front image, the rear image, the left image, and the right image of the host vehicle 100, and may provide the acquired image, which serves as the image information, to a blind spot range generator 210 and a traveling road information generator 230 of the vehicle controller 200.

The vehicle controller 200 may include a blind spot range generator 210, a traveling road information generator 230, a blind spot range changing device 250, a blind spot dangerous level determining device 270, and a path generator 290.

The blind spot range generator 210 may receive, as the image information, the sensing result of the sensor 110 and a surrounding image, which is acquired from the image sensor 130, of the host vehicle 100. The blind spot range generator 210 may determine a default blind spot range of the large vehicle 50 traveling around the host vehicle 100, based on the image information.

In this case, the blind spot range generator 210 may provide, as default blind spot range information, the determined default blind spot range of the large vehicle 50 to the blind spot range changing device 250.

For example, the blind spot range generator 210 may sense the large vehicle 50 positioned around the host vehicle 100, based on the image information, may determine the type and the size of the large vehicle 50, may determine the default blind spot range of the large vehicle 50 traveling around the host vehicle 100, based on the type and the size of the large vehicle 50 and the information of the host vehicle 100, and may provide, as the default blind spot range information, the default blind spot range of the large vehicle 50 to the blind spot range changing device 250.

In addition, referring to FIG. 2, the blind spot range generator 210 may include an object type determining device 211, an object size determining device 213, a host vehicle information storage 215, and a blind spot range determining device 217.

The object type determining device 211 may determine the type of a vehicle traveling adjacent to the host vehicle 100, based on the image information, and may provide, as determined object type information, the determined information to the object size determining device 213 and the blind spot range determining device 217.

For example, when the vehicle traveling adjacent to the host vehicle 100 is determined as being the large vehicle 50, based on the image information, the object type determining device 211 may insert the information on that the vehicle traveling adjacent to the host vehicle 100 is the large vehicle 50, and information on the type of the large vehicle 50 into determined object type information, and may provide the inserting result to the object size determining device 213 and the blind spot range determining device 217. In this case, the type of the large vehicle 50 may include a truck or a bus.

The object size determining device 213 may calculate the size of the large vehicle 50, based on the image information, and provide, as object size information, the calculated information to the blind spot range determining device 217, when the information on that the vehicle traveling adjacent to the host vehicle 100 is the large vehicle 50 is inserted into the determined object type information provided from the object type determining device 211.

For example, the object size determining device 213 may calculate the total height and the width of the large vehicle 50, based on the image information, and provide, as the object size information, the calculated information to the blind spot range determining device 217, when receiving the information on that the vehicle traveling adjacent to the host vehicle 100 is the large vehicle 50, and the information on the type of the large vehicle 50.

The host vehicle information storage 215 may store information (such as the total height and the width of the host vehicle 100, and an area of a main portion (for example, a roof area of the vehicle or an area between an A pillar and a C pillar) forming the total height of the host vehicle 100) of the host vehicle 100, and may provide, as information (host vehicle information) on the host vehicle 100, the stored information to the blind spot range determining device 217.

The blind spot range determining device 217 may receive the determined object type information from the object type determining device 211, receive the object size information from the object size determining device 213, and receive the information on the host vehicle from the host vehicle information storage 215.

The blind spot range determining device 217 may generate the default blind spot range information, based on at least one of the determined object type information, the object size information, and the host vehicle information.

For example, the blind spot range determining device 217 may determine the default blind spot range of the large vehicle 50 traveling adjacent to the host vehicle 100, based on the type of the large vehicle 50, which is included in the determined object type information, the size of the large vehicle 50, which is included in the object size information, and the total height of the host vehicle 100 and the roof area of the host vehicle 100 which are included in the information on the host vehicle 100, and may output, as the default blind spot range information, the determined default blind spot range.

In other words, the blind spot range determining device 217 may select one of blind spots stored depending on types of large vehicles 50, based on the determined type of the large vehicle 50, may match the selected blind spot with the sensed large vehicle 50, and may determine the blind spot range matched with the large vehicle 50, based on the determined size of the large vehicle 50 and the total height and the roof area of the host vehicle 100, thereby determining the default blind spot range.

The traveling road information generator 230 may receive, as the image information, the surrounding image, which is acquired from the image sensor 130, of the host vehicle 100, may generate information on a road (traveling road of the host vehicle 100) on which the host vehicle 100 travels, based on the image information, and may provide, as traveling road information, the generated road information to the blind spot range changing device 250 and the blind spot dangerous level determining device 270.

For example, the traveling road information generator 230 may determine a curvature, a lateral gradient, a longitudinal gradient, and a merging point of the travelling road of the host vehicle 100, based on the image information, and may provide, as the traveling road information, the determined information to the blind spot range changing device 250 and the blind spot dangerous level determining device 270.

The blind spot range changing device 250 may receive the default blind spot range information provided from the blind spot range generator 210 and the traveling road information provided from the traveling road information generator 230.

The blind spot range changing device 250 may generate changed blind spot range information by changing the default blind spot range information, which is generated based on the image information, based on the traveling road information, and may provide the generated and changed blind spot range information to the blind spot dangerous level determining device 270.

For example, the blind spot range changing device 250 may expand or reduce the blind spot range of the large vehicle 50, which is included in the default blind spot range information, based on at least one of information on a curvature, information on a lateral gradient, or information on a longitudinal gradient of the traveling road, which is included in the traveling road information, and may output the expanded or reduced result serving as the changed blind spot range information.

The blind spot dangerous level determining device 270 may match the dangerous level with the changed blind spot range information, based on the traveling road information, and may output, as blind spot information, the information on the changed blind spot range information matched with the dangerous level.

For example, when a merging point, at which the travelling road of the host vehicle 100 is merged with another road, is included in the traveling road information, the blind spot dangerous level determining device 270 may determine a dangerous ranking for blind spots of the large vehicle 50, based on the traveling path of the host vehicle 100 and the traveling path of the large vehicle 50.

In other words, the blind spot dangerous level determining device 270 may match the dangerous level to the default blind sport range, which is changed depending on the traveling path of the host vehicle 100 and the traveling path of the large vehicle 50, based on the merging point included in the traveling road information.

The path generator 290 may generate a path to minimize the dangerous level, based on the traveling situation of the host vehicle 100, and may longitudinally or laterally control for the host vehicle 100 such that the host vehicle 100 may travel while deviating from or avoiding the blind spot.

The display 300 may include a sound device or a display device. The display 300 may link to a navigation device (not illustrated) to map a path (avoiding path) for avoiding the blind spot and a path (deviating path) for deviating from the blind spot to map data and may display the map data on a screen.

The speed controller 500 may control the host vehicle 100 to decelerate or accelerate on the traveling path, when the host vehicle 100 fails to generate the path for deviating from the blind spot or the path for avoiding the blind spot to travel.

The communication device 700, which makes communication with the large vehicle 50 that is able to make Vehicle to Anything (V2X) communication, and the V2X communication may include Vehicle to Infrastructure (V2I) or Vehicle to Vehicle (V2V). The communication device 700 may transmit traveling information including the position, the speed, the type, the status, or the path of the host vehicle 100 to the large vehicle 50.

Hereinafter, an operation for the blind spot range determining device 217 to generate the default blind spot range information, based on the determined object type information, object size information, and host vehicle information will be described with reference to FIGS. 3 to 5.

The blind spot range determining device 217 may have various types of blind spot information depending on the types of the blind spot 50.

The blind spot range determining device 217 may select one of blind spot information stored depending on the types of the large vehicle 50, based on the determined object type information, and may match the selected blind spot information with the sensed large vehicle 50.

Referring to FIG. 3, when the large vehicle 50 is a truck, the blind spot of the large vehicle 50 may include a left blind spot "A" of the large vehicle 50, a right blind spot "B" of the large vehicle 50, a front-right blind spot "C" of the large vehicle 50, and a rear blind spot "D" of the large vehicle 50.

In this case, the blind spot of the large vehicle 50, which is illustrated in FIG. 3, is shown on the assumption that the driver seat of the large vehicle 50 is positioned at the left side. Accordingly, when the driver seat of the large vehicle 50 is positioned at the right side, the form of the blind spot of the large vehicle 50 may be changed.

The blind spot range determining device 217 may expand or reduce the range (e.g., size) of the blind spot matched with the large vehicle 50, based on information on the host vehicle 100.

For example, the blind spot range determining device 217 may expand or reduce the blind spot range matched with the large vehicle 50, based on at least one of the total height of the host vehicle 100 or the roof area of the host vehicle 100, which are included in the information on the host vehicle 100.

In more detail, the blind spot range determining device 217 may expand the blind spot range matched with the large vehicle 50, as the total height of the host vehicle 100, which is included in the information on the host vehicle 100, is reduced.

Meanwhile, the blind spot range determining device 217 may reduce the blind spot range matched with the large vehicle 50, as the total height of the host vehicle 100, which is included in the information on the host vehicle 100, is increased.

Figure 4B:
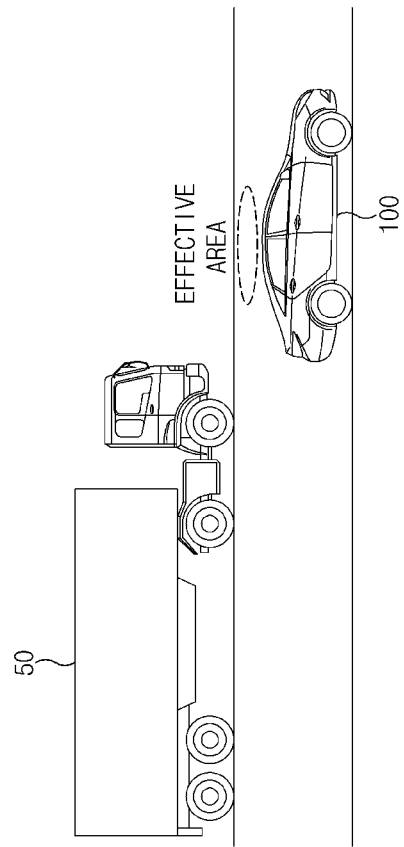
FIGS. 4A to 6B, and 7 are views illustrating detection of a blind spot of a large vehicle through a system for avoiding a blind spot of a vehicle, according to an embodiment of the present disclosure.
Figure 4A:
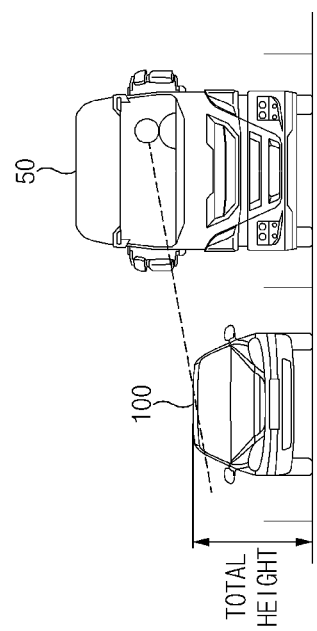

The blind spot range determining device 217 should be configured to expand or reduce the blind spot range matched with the large vehicle 50, based on the total height of the host vehicle 100, because the driver of the large vehicle 50 fails to sufficiently recognize the host vehicle 100, as the total height of the host vehicle 100 becomes lower, while being able to sufficiently recognize the host vehicle 100, as the total height of the host vehicle 100 becomes higher as illustrated in FIG. 4A.

Meanwhile, the blind spot range determining device 217 may reduce the blind spot range matched with the large vehicle 50, as the roof area of the host vehicle 100, which is included in the information on the host vehicle 100, is increased.

Meanwhile, the blind spot range determining device 217 may expand the blind spot range matched with the large vehicle 50, as the roof area of the host vehicle 100, which is included in the information on the host vehicle 100, is reduced.

The blind spot range determining device 217 should be configured to expand or reduce the blind spot range matched with the large vehicle 50, based on the roof area of the host vehicle 100, because the driver of the large vehicle 50 fails to sufficiently recognize the host vehicle 100, as the roof area of the host vehicle 100 becomes narrower, while being able to sufficiently recognize the host vehicle 100, as the roof area of the host vehicle 100 becomes wider as illustrated in FIG. 4B.

In other words, when the roof area of the host vehicle 100 is wider, the driver of the large vehicle 50 may more easily recognize the host vehicle 100, as compared to when the roof area of the host vehicle 100 is narrower. Accordingly, the matched blind spot of the large vehicle 50 may be expanded or reduced based on the roof area of the host vehicle 100, thereby ensuring the safety of the host vehicle 100.

In addition, the blind spot range determining device 217 may expand or reduce the blind spot range matched with the large vehicle 50, based on the total height of the large vehicle 50, which is included in the information on the object size.

Figure 5A:
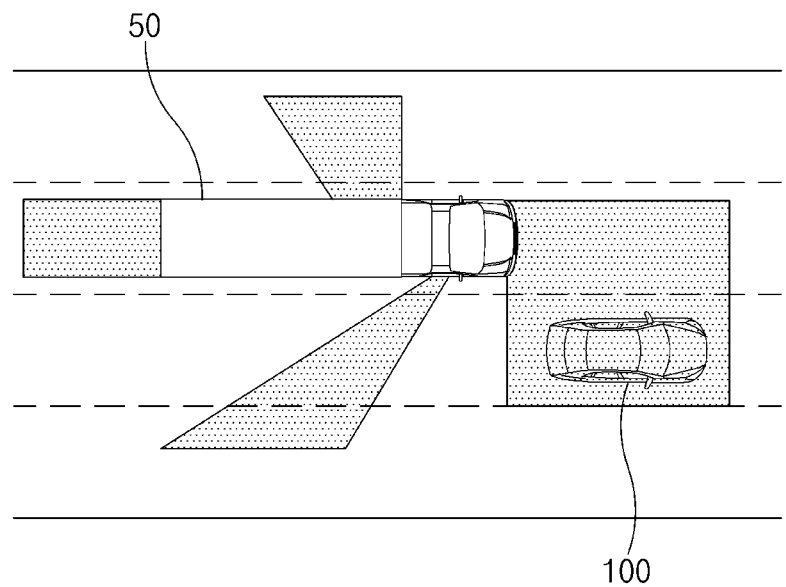

For example, as illustrated in FIG. 5A, the blind spot range determining device 217 may expand the blind spot range matched with the large vehicle 50, as the total height of the large vehicle 50, which is included in the object size information, becomes higher.

Figure 5B:
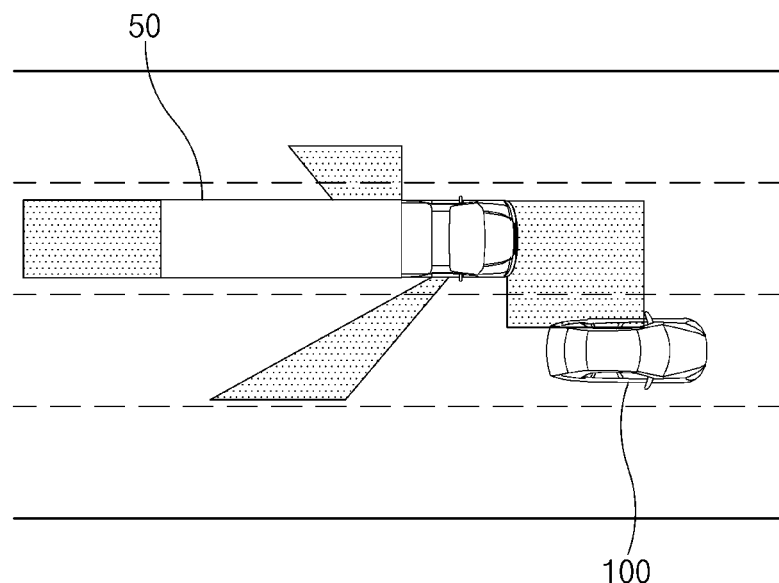

For example, as illustrated in FIG. 5B, the blind spot range determining device 217 may reduce the blind spot range matched with the large vehicle 50, as the total height of the large vehicle 50, which is included in the object size information, becomes lower.

The blind spot range determining device 217 should be configured to expand or reduce the blind spot range matched with the large vehicle 50, based on the total height of the large vehicle 50, because the driver of the large vehicle 50 having the higher total height fails to sufficiently recognize the host vehicle 100 traveling adjacent to the large vehicle 50 while the driver of the large vehicle 50 having the lower total height sufficiently recognizes the host vehicle 100 traveling adjacent to the large vehicle 50.

In other words, the driver of the large vehicle 50 having the lower total height may more easily recognize the host vehicle 100 traveling adjacent to the large vehicle 50, as compared with the driver of the large vehicle 50 having the higher total height. Accordingly, the safety of the host vehicle 100 may be ensured by expanding or reducing the blind spot of the large vehicle 50 depending on the sensed total height of the large vehicle 50.

As described above, the blind spot range changing device 250 of FIG. 1 may change the default blind spot range information of the large vehicle 50, which is generated from the blind spot range generator 210, based on the traveling road information, and may output, as the changed blind spot range information of the large vehicle 50, the default blind spot range information of the large vehicle 50, which is changed.

For example, the blind spot range changing device 250 may change the default blind spot range information of the large vehicle 50, based on the information on the curvature, the information on the lateral gradient, and the information on the longitudinal gradient included in the traveling road information of the host vehicle 100, and may output, as the changed blind spot range information of the large vehicle 50, the default blind spot range information of the large vehicle 50, which is changed.

Figure 6B:
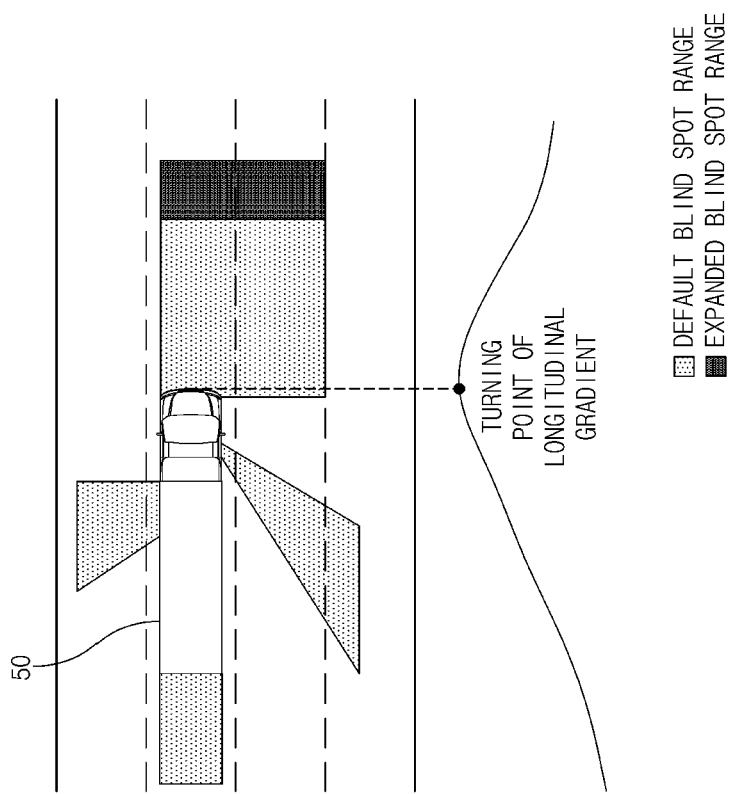
Figure 6A:
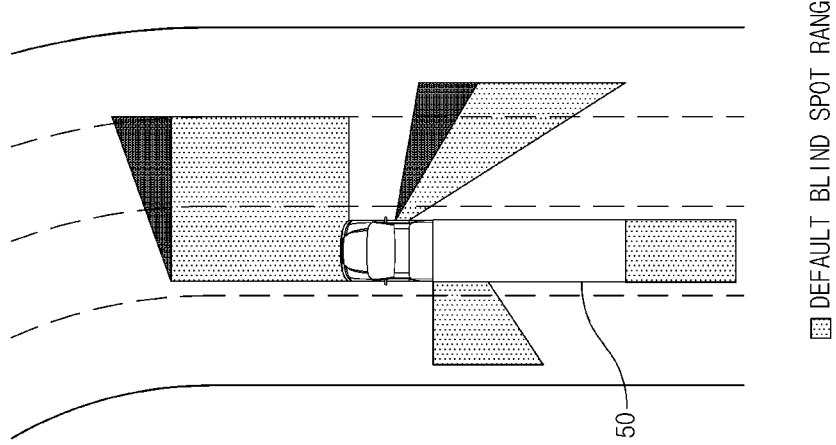

As illustrated in FIG. 6A, the blind spot range changing device 250 may expand a right blind spot range of the large vehicle 50 on a left turn road, based on the curvature of the traveling road of the host vehicle 100, which is included in the traveling road information, and may insert information on the expanded right blind spot of the large vehicle 50 into the changed blind spot range. In this case, the blind spot range changing device 250 may expand the right blind spot range of the large vehicle 50, as the curvature of the left turn road is increased. Although not illustrated, the blind spot range changing device 250 may expand a left blind spot range of the large vehicle 50 on a right turn road, based on the curvature of the traveling road of the host vehicle 100, which is included in the traveling road information.

In this case, the blind spot range changing device 250 may expand the left blind spot range of the large vehicle 50, as the curvature of the right turn road is increased.

As described above, the blind spot range changing device 250 may expand or reduce the default blind spot range, which is included in the default blind spot range information of the large vehicle 50, based on the curvature of the road, and may output information on the expanded or reduced range as the changed blind spot range information of the large vehicle 50.

In addition, the blind spot range changing device 250 may change the default blind spot range information of the large vehicle 50, based on the information on the longitudinal gradient of the travelling road included in the traveling road information, and may output, as the changed blind spot range information of the large vehicle 50, the default blind spot range information of the large vehicle 50 which is changed.

For example, as illustrated in FIG. 6A, the blind spot range changing device 250 may expand a front-right blind spot of the large vehicle 50, when the large vehicle 50 reaches a turning point of the longitudinal gradient included in the traveling road information. In this case, although FIG. 6B illustrates that the front-right blind spot of the large vehicle 50 is expanded at the turning point of the longitudinal gradient, at which an uphill is switched to a downhill, the front-right blind spot of the large vehicle 50 may be reduced at a point at which the downhill is switched to the uphill.

Although illustrated in FIGS. 6A-6B, the blind spot range changing device 250 may expand and reduce the front-right blind spot of the large vehicle 50 at a turning point of the lateral gradient, based on information on the lateral gradient of the travelling road, which is included in the traveling road information.

As described above, the blind spot range changing device 250 may expand or reduce the default blind spot range, which is included in the default blind spot range information of the large vehicle 50, at the turning point of the longitudinal gradient or the lateral gradient, and may output information on the expanded or reduced range as the changed blind spot range information of the large vehicle 50.

The blind spot dangerous level determining device 270 of FIG. 1 may match the dangerous level with the blind spot of the large vehicle 50, which is included in the changed blind spot range information, based on the traveling road information, and may output the changed blind spot range information of the large vehicle 50, which is matched with the dangerous level, as blind spot information.

For example, when a merging point, at which the traveling road of the host vehicle 100 is merged with another road, is included in the traveling road information, the blind spot dangerous level determining device 270 may determine the dangerous ranking with respect to the blind spot of the large vehicle 50, based on the traveling path of the large vehicle 50 and the traveling path of the host vehicle 100, and may output the change blind spot range information having the determined dangerous ranking, as the blind spot information.

Figure 7:
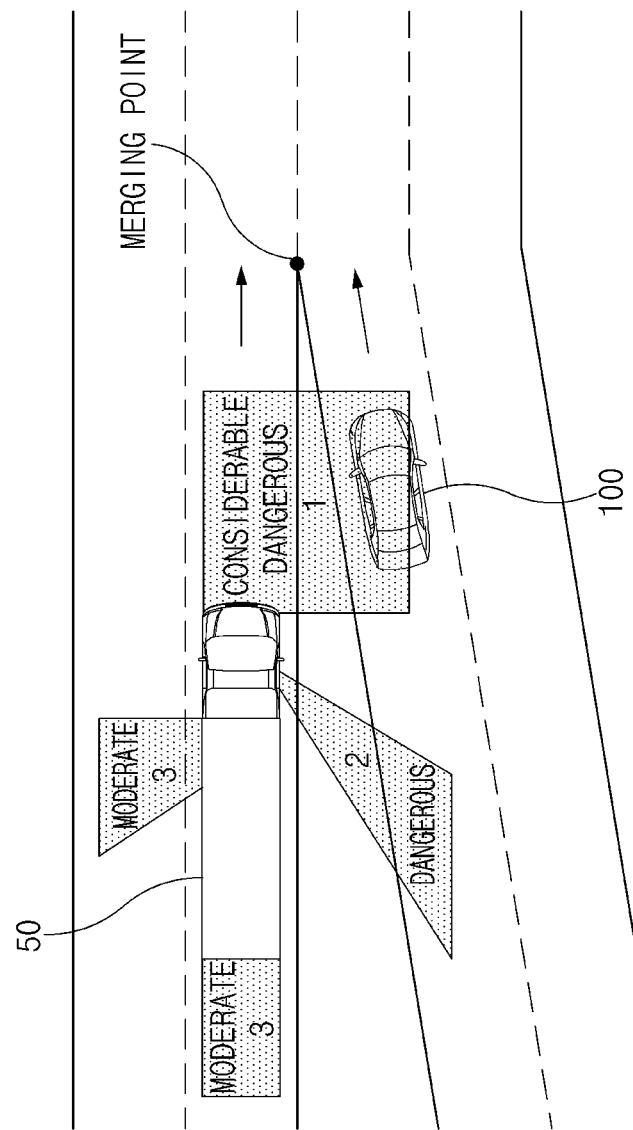

For example, as illustrated in FIG. 7, when viewed from the merging point included in the traveling road information and when the host vehicle 100 is traveling at the right side of the large vehicle 50, the blind spot dangerous level determining device 270 may match a dangerous level, which is higher than that of the left blind spot, to the right blind spot of the large vehicle 50 and the changed blind spot range information of the large vehicle 50 having the matched dangerous level may be output as the blind spot information.

Meanwhile, although not disclosed in drawings, when viewed from the merging point included in the traveling road information and when the host vehicle 100 is traveling at the left side of the large vehicle 50, the blind spot dangerous level determining device 270 may match a dangerous level, which is higher than that of the right blind spot, to the left blind spot of the large vehicle 100 and the change blind spot range information of the large vehicle 50 having the matched dangerous level may be output as the blind spot information.

In addition, the blind spot dangerous level determining device 270 may generate blind spot information by matching the highest dangerous level to a blind spot of the large vehicle 50, in which the host vehicle 100 is to be merged at the merging point, based on the traveling path of the host vehicle 100 and the traveling path of the large vehicle 50.

The vehicle controller 200 may provide an alert to the driver of the host vehicle 100 or may provide a path for deviating from or avoiding the blind spot of the large vehicle 50, when determining that the host vehicle 100 travels in the blind spot of the large vehicle 50 or the traveling path of the host vehicle 100 passes through the blind spot of the large vehicle 50 by using blind spot information For example, when the host vehicle 100 is positioned in the blind spot of the large vehicle 50, the vehicle controller 200 may control the speed controller 500 to decelerate the speed of the host vehicle 100 or may change a lane of the host vehicle 100 to a next lane after sensing that another vehicle is present on the next lane through the sensor 100, thereby deviating from the blind spot of the large vehicle 50.

Meanwhile, when the host vehicle 100 deviates from the blind spot range of the large vehicle 50, when another vehicle is present in back of the host vehicle 100 to prevent the speed of the host vehicle 100 from being decelerated, and when another vehicle is present even on a next lane to prevent the path for deviating from the blind spot from being generated, the traveling information of the host vehicle 100 may be transmitted to the large vehicle 50 such that the driver of the large vehicle 50 is notified of that the host vehicle 100 is present in the blind spot.

In this case, when V2X communication is able to be made with the large vehicle 50, the traveling information (the position, the speed, the type, the status, or the path) of the host vehicle 100 may be transmitted by utilizing V2X communication (see FIG. 8A). When V2X communication with the large vehicle 50 is failed, the present of the host vehicle 100 may be notified through a typical manner (an emergency light, a main beam headlight, or a horn) (see FIG. 8B).

In addition, when the host vehicle 100 generates the avoiding path, the vehicle controller 200 may pass through the blind spot of the large vehicle 50. Even in this case, the traveling information of the host vehicle 100 may be transmitted to the large vehicle 50, thereby notifying the driver of the large vehicle 50 of that the host vehicle 100 is present in the blind spot.

Figure 9A:
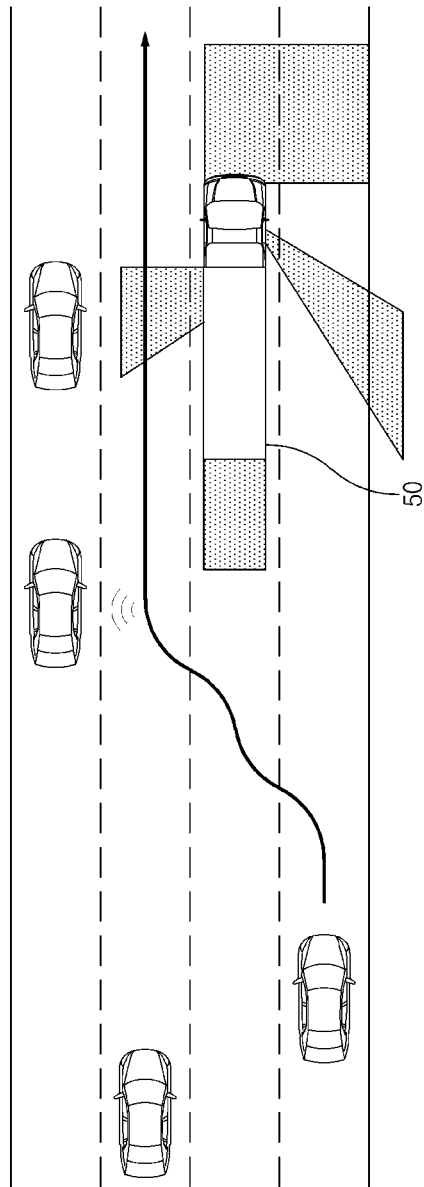
Figure 9B:
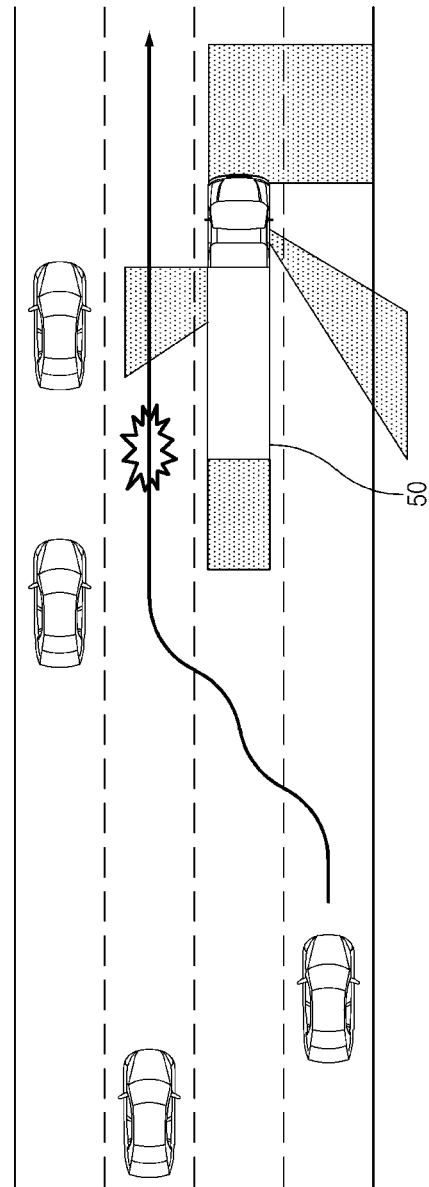

Similarly, when V2X communication is able to be made with the large vehicle 50, the traveling information (the position, the speed, the type, the status, or the path) of the host vehicle 100 may be transmitted by utilizing V2X communication (see FIG. 9A). When V2X communication with the large vehicle 50 is failed, the present of the host vehicle 100 and movement through the blind spot may be notified through a typical manner (an emergency light, a main beam headlight, or a horn) (see FIG. 9B).

Meanwhile, when the host vehicle 100 stays in the blind spot of the large vehicle 50 for a specific time without deviating from the blind spot, in the state that the host vehicle 100 is positioned in the blind spot, the driver of the host vehicle 100 and the driver of the large vehicle 50 may be notified of that the host vehicle 100 stays in the blind spot of the large vehicle 50 for the specific time. Accordingly, an alert may be provided to the driver of the host vehicle 100 such that the host vehicle 100 deviates from the blind spot. In addition, a warning may be provided to the driver of the large vehicle 50 such that the driver of the large vehicle 50 carefully drives the large vehicle 50.

Figure 10:
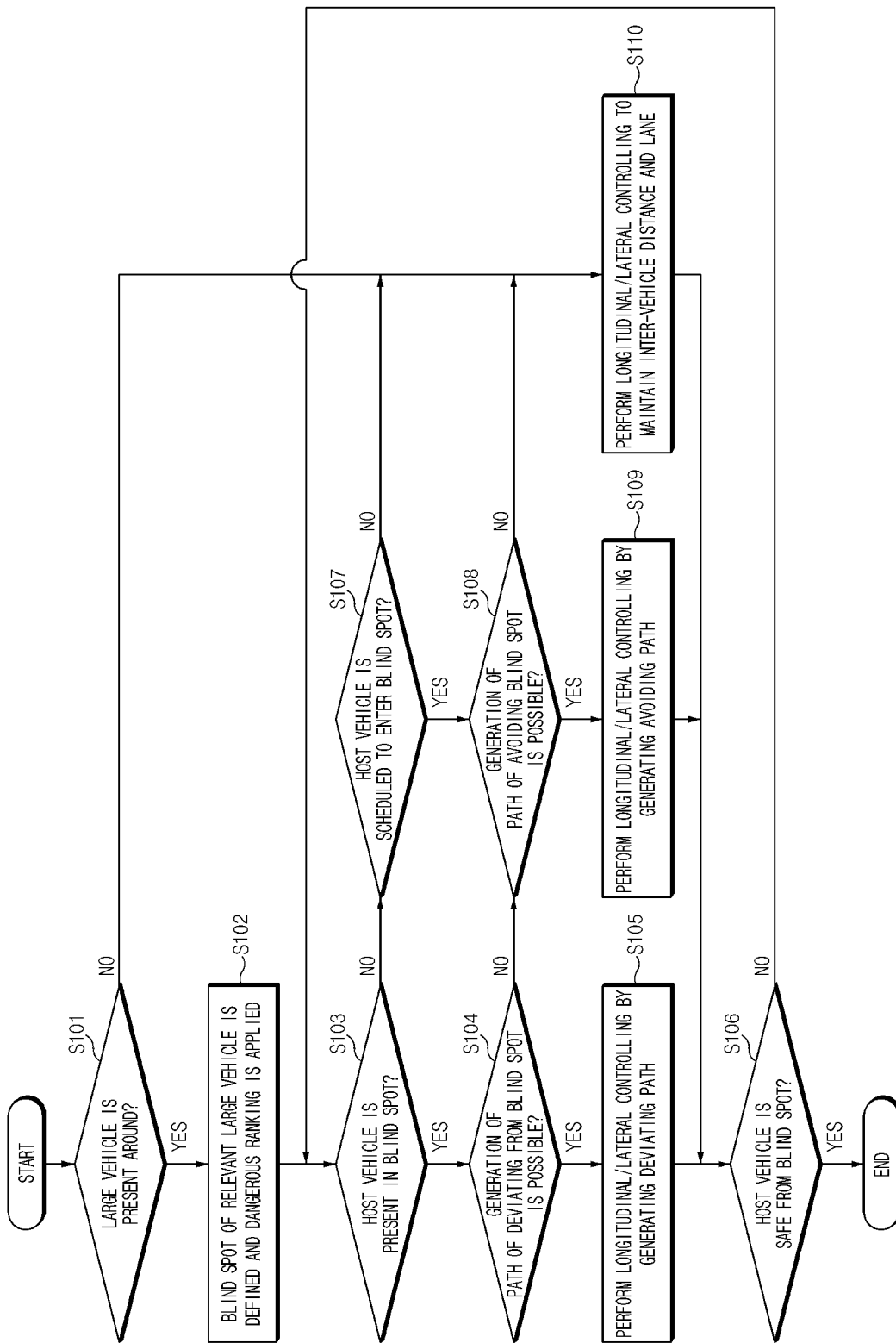

Hereinafter, a method for avoiding a blind spot of a vehicle, according to another embodiment of the present disclosure will be described with reference to FIGS. 10 and 11. FIGS. 10 and 11 are flowcharts illustrating the method for avoiding the blind spot of the vehicle, according to an embodiment of the present disclosure.

The following description will be made on the assumption that the system for avoiding the blind spot of the vehicle performs processes of FIGS. 10 and 11.

First, the large vehicle 50 traveling adjacent to the host vehicle 100 may be sensed through the image sensor 130 (S101), and the dangerous level may be determined after determining the blind spot range of the large vehicle 50 (S102)

Thereafter, the vehicle controller 200 may determine whether the host vehicle 100 is present in the blind spot of the large vehicle 50 (S103), and whether the path of deviating from the blind spot is generated (S104), and when the generation of the path of deviating from the blind spot is possible, the vehicle controller 200 may control the host vehicle 100 to accelerate or decelerate or to change a lane to a next lane, such that the host vehicle 100 deviates from the blind spot of the large vehicle 50 (S105).

Thereafter, when the host vehicle 100 is scheduled to enter the blind spot of the large vehicle 50 (S107), vehicle controller 200 determines whether the path of avoiding the blind spot is generated (S108). When the path of avoiding the blind spot is generated, vehicle controller 200 may control the host vehicle 100 to accelerate or decelerate or to change a lane to a next lane, such that the host vehicle 100 deviates from the blind spot of the large vehicle 50 (S109).

Meanwhile, when the host vehicle 100 does not enter the blind spot or when the path of avoiding the blind spot is failed, the vehicle controller 200 may control the host vehicle 100 to currently maintain an inter-vehicle distance to the large vehicle 50 and maintain a current lane (S110).

In addition, after generating the path for avoiding or deviating from the blind spot of the large vehicle 50 (S201), the position and the presence of the host vehicle 100 may be needed to be notified to the driver of the large vehicle 50 (S202).

In this case, when V2X communication is able to be made with the large vehicle 50 (S203), the traveling information including the position, the speed, the type, or the status, or the path of the host vehicle 100 may be notified by utilizing V2X communication (S204). When V2X communication with the relevant large vehicle 50 is failed, the presence of the host vehicle 100 may be notified through the typical manner (an emergency light, a main beam headlight, or a horn) (S205).

As described above, according to the present disclosure, when the blind spot of the large vehicle adjacently traveling is formed, the path for minimizing the dangerous level may be generated based on the traveling situation of the host vehicle, and the host vehicle may be longitudinally or laterally controlled, such that the host vehicle avoids the blind spot. When the generation of the path of deviating from the blind spot of the large vehicle is failed, or when the path of avoiding the blind spot of the large vehicle includes a path of passing through the blind spot, that is, when the deviation from the blind spot formed by the large vehicle is failed, the presence of the host vehicle and the movement of the host vehicle may be notified to the driver of the large vehicle or the traveling information may be provided to the driver of the large vehicle, thereby minimizing the dangerous level of the collision accident, which may occur during the avoidance, such that the safe driving of the host vehicle is ensured.

According to an aspect, there is provided a system for avoiding a blind spot of a vehicle and a method thereof, in which, when a blind spot of a large vehicle adjacently traveling is formed, a path for minimizing a dangerous level is generated based on a traveling situation of a host vehicle, and the host vehicle is longitudinally or laterally controlled, such that the host vehicle avoids the blind spot. In addition, when the generation of the path of deviating from the blind spot of the large vehicle is failed, or when a path of avoiding the blind spot of the large vehicle includes a path of passing through the blind spot, that is, when the deviation from the blind spot formed by the large vehicle is failed, the presence of the host vehicle and the movement of the host vehicle are notified to the driver of the large vehicle or the traveling information is provided to the driver of the large vehicle, thereby minimizing the dangerous level of the collision accident, which occurs during the avoidance, such that the safe driving of the host vehicle is ensured.

According to an aspect, when the blind spot of the large vehicle adjacently traveling is formed, the path for minimizing the dangerous level may be generated based on the traveling situation of the host vehicle, and the host vehicle may be longitudinally or laterally controlled, such that the host vehicle avoids the blind spot. When the generation of the path of deviating from the blind spot of the large vehicle is failed, or when the path of avoiding the blind spot of the large vehicle includes a path of passing through the blind spot, that is, when the deviation from the blind spot formed by the large vehicle is failed, the presence of the host vehicle and the movement of the host vehicle may be notified to the driver of the large vehicle or the traveling information may be provided to the driver of the large vehicle, thereby minimizing the dangerous level of the collision accident, which may occur during the avoidance, such that the safe driving of the host vehicle is ensured.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for avoiding a blind spot of a vehicle, the apparatus comprising:
    an image sensor configured to obtain image information by acquiring a surrounding image of a host vehicle; and
    a processor configured to:
        sense the vehicle traveling adjacent to the host vehicle based on the image information;
        determine a blind spot range of the vehicle dependent on traveling road information;
        determine a dangerous level of the determined blind spot range; and
        perform a generation, based on a traveling situation of the host vehicle, of a path for the host vehicle to deviate from the blind spot or to avoid the blind spot.

2. The apparatus of claim 1, wherein the processor is configured to:
    determine a default blind spot range of the vehicle;
    obtain, as the traveling road information, information on a road on which the host vehicle is travelling based on the image information;
    change the default blind spot range based on the traveling road information, to generate the determined blind spot range; and
    match the dangerous level with the changed default blind spot range; and
    wherein the generation of the path includes generation of the path to minimize the dangerous level, based on the traveling situation of the host vehicle and to longitudinally or laterally control the host vehicle.

3. The apparatus of claim 2, wherein, for the determination of the default blind spot range, the processor is configured to:
    determine a type of the vehicle based on the image information;
    calculate a size of the vehicle based on the image information; and
    determine the default blind spot range based on the type of the vehicle, the size of the vehicle, a height of the host vehicle, and a roof area of the host vehicle.

4. The apparatus of claim 3, wherein, for the determination of the default blind spot range based on the type of the vehicle, the size of the vehicle, the height of the host vehicle, and the roof area of the host vehicle, the processor is configured to:
    select, based on the type of the vehicle, one blind spot from among blind spots that correspond to types of vehicles;
    match the selected one blind spot with the vehicle; and
    determine the default blind spot range based on the size of the vehicle, the height of the host vehicle, and the roof area of the host vehicle.

5. The apparatus of claim 2,
    wherein the changing of the default blind spot range is performed based on a traveling path of the host vehicle and a traveling path of the vehicle; and
    wherein the matching is performed based on a merging point included in the traveling road information.

6. The apparatus of claim 1, wherein the processor is further configured to control transmission of traveling information of the host vehicle to the vehicle in response to the performed generation of the path failing to generate the path in which the host vehicle deviates from the determined blind spot range of the vehicle.

7. The apparatus of claim 1, wherein the processor is further configured to control a transmission of traveling information of the host vehicle to the vehicle in response to a traveling path of the host vehicle, subsequent to the generated path having been generated in the generation of the path, failing to avoid the blind spot.

8. The apparatus of claim 1, wherein the processor is further configured to control the host vehicle to decelerate on a traveling path, in response to the performed generation of the path failing to generate the path in which the host vehicle deviates from the blind spot or avoids the blind spot.

9. The apparatus of claim 1, wherein, for the generating of the path, the processor is configured to generate the path to minimize the dangerous level.

10. The apparatus of claim 1, wherein the vehicle is larger than the host vehicle.

11. A processor-implemented method for avoiding a blind spot of a vehicle, the method comprising:
   obtaining image information by acquiring a surrounding image of a host vehicle through an image sensor;
   sensing the vehicle traveling adjacent to the host vehicle based on the image information;
   determining a blind spot range of the vehicle dependent on traveling road information;
   determining a dangerous level of the determined blind spot range; and
   performing a generating, based on a traveling situation of the host vehicle, of a path for the host vehicle to deviate from the blind spot or to avoid the blind spot.

12. The method of claim 11,
   wherein the sensing of the further comprises
   determining a default blind spot range of the vehicle,
   wherein the method further comprises:
      obtaining, as the traveling road information, information on a road on which the host vehicle is travelling-, based on the image information;
      changing the default blind spot range based on the traveling road information, to generate the determined blind sport range; and
      matching the dangerous level with the changed default blind spot range, and
   wherein the generating of the path comprises generating the path to minimize the dangerous level, based on the traveling situation of the host vehicle and longitudinally or laterally controlling the host vehicle.

13. The method of claim 12, wherein the determining of the default blind spot range comprises:
   determining a type of the vehicle based on the image information;
   calculating a size of the vehicle based on the image information;
   determining the default blind spot range, based on the type of the vehicle, the size of the vehicle, a height of the host vehicle, and a roof area of the host vehicle.

14. The method of claim 13, wherein the determining of the default blind spot range based on the type of the vehicle, the size of the vehicle, the height of the host vehicle, and the roof area of the host vehicle comprises:
   selecting, based on the type of the vehicle, ne blind spot from among blind spots that correspond to types of vehicles;
   matching the selected one blind spot with the vehicle; and
   determining the default blind spot range based on the determined size of the vehicle, the height of the host vehicle, and the roof area of the host vehicle.

15. The method of claim 12,
   wherein the changing of the default blind spot range is performed based on a traveling path of the host vehicle and a traveling path of the vehicle, and
   wherein the matching
   is performed based on a merging point included in the traveling road information.

16. The method of claim 11, further comprising transmitting traveling information of the host vehicle to the vehicle in response to the performing of the generating of the path failing to generate the path in which the host vehicle deviates from the determined blind spot range of the vehicle.

17. The method of claim 11, further comprising transmitting traveling information of the host vehicle to the vehicle in response to a traveling path of the host vehicle, subsequent to the generated path having been generated in the generating of the path, failing to avoid the blind spot.

18. The method of claim 11, further comprising controlling the host vehicle to decelerate on a traveling path, in response to the performing of the generating of the path failing to generate the path in which the host vehicle deviates from the blind spot or avoids the blind spot.

19. A non-transitory computer-readable storage medium storing instructions that, when executed by a processor, cause the processor to perform the method of claim 10.

* * * * *